Patented Nov. 11, 1924.

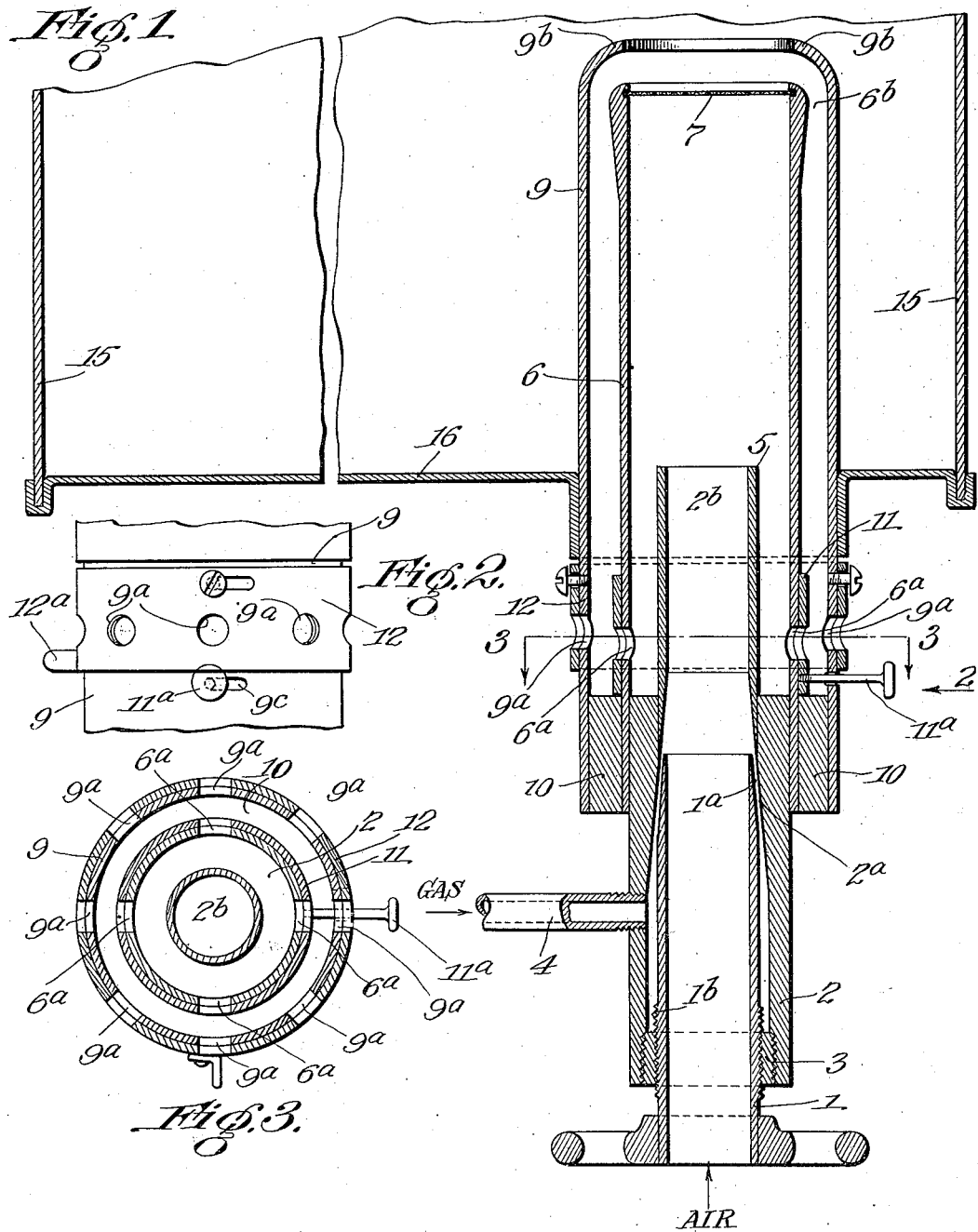

1,515,172

UNITED STATES PATENT OFFICE.

THOMAS A. RONSTROM, OF CHICAGO, ILLINOIS.

GAS BURNER.

Application filed October 18, 1920. Serial No. 417,538.

*To all whom it may concern:*

Be it known that I, THOMAS A. RONSTROM, a subject of the King of Sweden, having made application for citizenship in the United States, residing at Chicago, in the county of Cook and State of Illinois, have invented certain new and useful Improvements in Gas Burners, of which the following is a specification, reference being had to the accompanying drawings, forming a part thereof.

The purpose of this invention is to provide an improved construction of gas burner, particularly for heating purposes. It consists in the elements and features of construction shown and described as indicated in the claims.

In the drawings:

Figure 1 is an axial section of a burner embodying this invention, the same being shown mounted in and protruding through the base of a heating chamber, such, for example, as might be employed for a water heater having water circulation tubes, not shown in the drawings.

Figure 2 is a detail side elevation looking in the direction of the arrow, 2, on Figure 1.

Figure 3 is a section at the line, 3—3, on Figure 1.

In the structure shown in the drawings, 1 is a primary air inlet pipe for the burner. 2 is a pipe which is co-axial with the pipe, 1, encompassing the same and annularly spaced therefrom and mounted thereon by means of a bushing, 3, interiorly threaded for screwing the primary air pipe, 1, through it, whereby said primary air pipe is rendered axially adjustable for purposes which will hereafter appear. The pipe, 2, at its lower part which encompasses the upper part of the primary air pipe, 1, constitutes the discharge portion of the gas inlet pipe whose initial portion is a pipe, 4, screwed into the side of the pipe, 2, for opening into the annular space between said pipe, 2, and the pipe, 4. Said pipe, 2, is interiorly tapered at its upper part $2^a$, surrounding the discharge end portion of the primary air inlet pipe, the taper preferably continuing beyond the discharge end of the said primary inlet pipe and reducing the interior diameter of said inlet pipe to less than the interior diameter of the air pipe, 1. Preferably the discharge end of the pipe, 1, is exteriorly tapered at $1^a$, so that it may be made to seat on the interiorly tapered wall of the pipe, 2, the threaded portion $1^b$, of the pipe, 1, where it is screwed through the bushing, 3, being sufficiently extended to permit said pipe, 1, to be thus adjusted to seating on the interiorly tapered wall of the pipe, 2. The gas is intended to be supplied under pressure, and the above construction, it will be seen, results in the discharge of an annular jet of gas around the tapered discharge end $1^a$ of the primary air inlet pipe, 1, whereby there will be produced an entrainment or drawing in of the air through said air inlet pipe by the annular gas jet delivered under pressure. The pipe, 2, extends beyond the discharge end of the pipe, 1, for a considerable distance, and the extended portion marked with reference numeral 5 at its upper end constitutes a mixing chamber in which the gas delivered under pressure and the air entrained and drawn in through the primary air supply pipe, 1, will be thoroughly mixed, such mixture being promoted by the slightly oblique direction of discharge of the gas following the interior taper of the pipe, 2, at the portion which joins the extended discharge end, 5, of the air inlet pipe. A secondary air supply pipe, 6, encompasses and is annularly spaced from said extension, 5, of the pipe, 2, by reason of the relatively thick wall of the upper end of said pipe, 2, with which the pipe, 6, is telescopically engaged; and said pipe, 6, extends upwardly beyond the upper discharge end of the primary mixing chamber, $2^b$, and at its upper edge is preferably capped with a fine net wire screen, 7. Near its lower end the pipe, 6, has air inlet apertures, $6^a$, and thereby said pipe constitutes a secondary air supply pipe, the air which enters through said apertures, $6^a$, being discharged annularly around the mixture which is discharged from the upper end of the primary mixing chamber, $2^b$, the portion of said pipe, 6, which extends above the upper end of said primary mixing chamber constituting a secondary mixing chamber in which the additional supply of air is intermixed, the mixture being rendered more complete by its discharge through the fine net wire screen, 7. 9 is an outer pipe annularly spaced from the secondary air supply pipe, 6, and secured thereto by means of an annular bushing, 10, at its lower end above which bushing the pipe, 9, has a series of apertures, 9ª, substantially opposite the apertures, 6ª, of the pipe, 6, and preferably of greater number than the apertures, 6ª, while the remainder are radially opposite the intervals between them.

By this arrangement of the apertures it will be seen that air is supplied to the pipe, 6, through the apertures, 9ª, which are aligned with the apertures, 6ª, and that additional air may enter through the remainder of the apertures, 9ª, for supplying air which will be delivered upwardly through said pipe, 9ª, for discharge at 6ᵇ around the upper end of the secondary mixing chamber which is formed by the upper portion of the pipe, 6, as above set forth. At the upper end of the pipe, 9, terminating a short distance above the screen 7, which caps the supply pipe, said pipe, 9, has an in-turned flange, 9ᵇ, forming a projecting lip for directing the air current which rises through the pipe, 9, inward radially into and across the mixture which is discharged through the wire screen, 7, for supporting combustion, it being the intended mode of operation of the structure that the mixture discharged through the screen shall be ignited at this point, and the intended proportions and adjustment of the parts being such that the air which may be supplied through said outer pipe, 9, completes the supply necessary for perfect combustion at the point of ignition.

In addition to the adjustment of the primary and air inlets for regulating the annular aperture through which the gas is discharged, and thereby regulating the amount of gas admitted for mixture with the primary air supply, the apertures, 6ª and 9ª, in the pipes, 6 and 9, respectively, are provided with means for regulation consisting of encompassing rings, 11 and 12, respectively, having apertures corresponding to and adapted to register with the apertures, 6ª and 9ª, of said pipes, 6 and 9, respectively, each of said rings being adapted to be adjusted around the pipe on which it is mounted, for closing said apertures more or less, said rings having handles, 11ª and 12ª, for so adjusting them, the handle, 11ª, being extended through the circumferential slot, 9ᶜ, in the pipe, 9.

It is designed that this burner shall be employed in a heater into whose casing it is intruded through an aperture in the base as shown in Figure 1, the heater as to its enclosing walls being seen at 15, and the base at 16, said casing having no other inlet or means of access of air for causing combustion or mixing with the products of combustion, except that which enters through the properly proportioned and adjusted apertures of the burner. It is in view of this manner of use that the burner is provided with the outer pipe, 9, and with the feature consisting of the in-turned lip, 9ᵇ, of said pipe, by which said final supply of air is thoroughly intermixed with the preceding mixture for producing perfect combustion. And for further insuring this result and adapting the burner to use a maximum quantity of gas and thereby develop a maximum amount of heat within given dimensions, the details of construction, particularly including said in-turned lip, are such that upon ignition the said lip and through it by conduction the entire pipe, 9, becomes highly heated and in practice nearly to red heat, the pipe, 6, also becoming heated to a high temperature for a considerable distance including so much of its length as constitutes the secondary mixing chamber 2ᵇ, and this results in a strong natural draft, supplementing the draft which is produced by entrainment, and increasing the air supply which is taken in through the primary air inlet, as well as through the secondary air pipe, 6, and the outer pipe, 9. The result is that the burner being started with the primary air pipe adjusted so as to limit the gas to a very narrow annular rift, and its correspondingly limited quantity, as the burning proceeds and the burners become heated, the pipe 1, may be adjusted to increase the gas supply because the draft resulting from the heating of the burner has largely increased the air supply; and further adjustment may be made up to a certain maximum point for which the burner is calculated in its several dimensions.

I claim:—

1. A gas burner comprising in combination, a primary air supply pipe centrally positioned; a pipe for supplying gas under pressure, having an annular discharge encompassing the discharge end of the primary air supply pipe, whereby the primary air supply is entrained by the gas discharged under pressure, a mixing chamber beyond the discharge end of the primary air and gas supply passages; a secondary air pipe and an outer pipe having each restricted air inlets at their lower parts, the outer pipe extending down and being closed as to air access, below the air inlet of the secondary pipe, whereby the air supply for the secondary pipe is derived through the air inlets of the outer pipe, said outer pipe inlets being in excess of the air inlets of the secondary pipe.

2. A gas burner comprising in combination, a primary air supply pipe centrally positioned; a pipe for supplying gas under pressure, having an annular discharge encompassing the discharge end of the primary air supply pipe, whereby the primary air supply is entrained by the gas discharged under pressure, a mixing chamber beyond the discharge end of the primary air and gas supply passages; a secondary air pipe and an outer pipe concentrically disposed about and beyond the discharge end of the primary air supply pipe, the outer pipe having at its discharge end beyond the discharge end of said secondary air pipe, with an in-turned flange or lip for directing the air discharge of said outer pipe inward across the discharge from the secondary air pipe.

In testimony whereof, I have hereunto set my hand at Chicago, Illinois, this 13th day of October, 1920.

THOMAS A. RONSTROM.